(12) United States Patent
Spears et al.

(10) Patent No.: US 12,196,347 B2
(45) Date of Patent: *Jan. 14, 2025

(54) GRIP LOCK FIRE SPRINKLER CONNECTOR

(71) Applicant: Spears Manufacturing Co., Sylmar, CA (US)

(72) Inventors: Wayne Spears, Ketchikan, AK (US); Robert Wayne Spears, II, Sylmar, CA (US)

(73) Assignee: Spears Manufacturing Co., Sylmar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,793

(22) Filed: Jul. 30, 2021

(65) Prior Publication Data

US 2021/0356059 A1    Nov. 18, 2021

Related U.S. Application Data

(63) Continuation of application No. 16/532,858, filed on Aug. 6, 2019, now Pat. No. 11,105,448.

(51) Int. Cl.
| | |
|---|---|
| *F16L 21/08* | (2006.01) |
| *A62C 35/02* | (2006.01) |
| *A62C 37/08* | (2006.01) |
| *F16L 21/03* | (2006.01) |
| *F16L 37/091* | (2006.01) |

(52) U.S. Cl.
CPC ............ *F16L 21/08* (2013.01); *F16L 37/091* (2013.01); *A62C 35/02* (2013.01); *A62C 37/08* (2013.01); *F16L 21/03* (2013.01)

(58) Field of Classification Search
CPC ............ F16L 21/08; F16L 21/03; F16L 5/04; F16L 55/1026; F16L 17/08; F16L 19/0218; F16L 19/045; F16L 19/08; F16L 19/086; F16L 19/12; F16L 35/00; F16L 41/08; F16L 37/0925; F16L 37/091; F16L 27/08; F16L 25/14; A62C 37/08; A62C 35/02; A62C 35/023; A62C 35/04; A62C 35/06; A62C 35/08

USPC ......... 285/399, 1, 5, 93, 187, 213, 339, 345, 285/349, 351, 353, 354, 355, 356, 357, 285/374, 379, 385, 340; 169/37, 41, 42, 169/57, 58, 59

See application file for complete search history.

(56) References Cited

U.S. PATENT DOCUMENTS

| | | | |
|---|---|---|---|
| 6,024,175 A | * | 2/2000 | Moore, Jr. ...................... 169/37 |
| 9,611,970 B2 | | 4/2017 | Spears et al. |
| 9,765,912 B2 | | 9/2017 | Spears et al. |
| 9,810,359 B2 | | 11/2017 | Spears et al. |

(Continued)

*Primary Examiner* — William S. Choi
(74) *Attorney, Agent, or Firm* — Irell and Manella LLP

(57) ABSTRACT

A grip lock connector member which connects a supply pipe from a source of water to a fire sprinkler through an interior grip lock connector. The grip lock connector includes a multiplicity of gripper teeth which form a tight grip connection to the supply pipe. The supply pipe is retained within an interior chamber and grasped and retained by the multiplicity of gripper teeth at the interior end of the interior chamber. A gasket or O-ring directly behind the gripper teeth facilitates a leakproof connection. At its opposite end, the grip lock connector includes female mating threads which receive male threads at a top location of a fire sprinkler.

20 Claims, 8 Drawing Sheets

(56) References Cited

U.S. PATENT DOCUMENTS

2010/0314869 A1\* 12/2010 Kuo ..................... F16L 37/091
2018/0013274 A1\* 1/2018 Yang .................... F16L 37/091
2018/0056318 A1\* 3/2018 Jackson \* cited by examiner

GRIP LOCK FIRE SPRINKLER CONNECTOR

CROSS-REFERENCE TO RELATED APPLICATION

This application is a Continuation of and claims priority under 35 U.S.C. § 120 to prior non-provisional patent application Ser. No. 16/532,858, filed on Aug. 6, 2019, which is hereby incorporated by reference as if set forth fully herein.

BACKGROUND OF THE INVENTION

1. Field of the Invention

The present invention relates to the field of water flow pipes used to facilitate the rapid flow of water to fire sprinklers to enable a fire inside a structure to be rapidly extinguished.

2. Background

Fire sprinkler systems are becoming increasingly common in construction of apartments, hotels, and single family homes. The fire sprinkler systems automatically deliver water to extinguish a fire to prevent property damage, harm to the occupants and save lives.

Fire sprinkler system pipes and fittings are available in a variety of materials including steel, copper and plastic. Due to the high cost of installation and the detrimental effects of corrosion, plastic fire sprinkler systems are becoming increasingly popular. Plastics used in such fire sprinkler plumbing include Chlorinated Vinyl Chloride (CPVC).

CPVC plumbing is most frequently joined by the use of solvents to partially dissolve both pipe and fitting which in combination with an interference fit develops a solvent weld. This solvent weld creates a permanent watertight joint.

Essential requirements for a solvent weld are adequate and complete application of the solvent requiring skill and time to allow the solvents to pass out of the joint "cure time".

Fire sprinkler plumbing is frequently installed before the interior of the structure is finished "roughed in" then completed after the wall coverings are completed. Work done after the walls are finished is more difficult using the process of solvent welding due to the limited access to the pipes and occasionally there are time constraints that make the "cure time" a significant disadvantage.

The last fitting in a pipe system used to convey water to a fire sprinkler discharge head is a head adapter. The head adapter connects to the distribution piping and has a threaded receptacle to receive the threads of the fire sprinkler head completing the entirety of the fire suppression system.

There is a significant need for a fire sprinkler fitting that satisfies the requirement of a head adapter that can be rapidly installed without solvent welding and the skill associated with it.

SUMMARY OF THE INVENTION

The present invention is a grip lock connector member which connects a supply pipe from a source of water to a fire sprinkler through an interior grip connection. The grip lock connection includes a ring retaining a multiplicity of gripper teeth which form a tight grip connection to the water supply pipe. The water supply pipe is retained within an interior chamber and grasped and retained by the multiplicity of gripper teeth at the interior end of the interior chamber. A gasket or O-ring directly behind the gripper teeth facilitates a leakproof connection.

It is therefore an object of the present invention to provide a connection member between the water supply pipe from a source of water and a fire sprinkler, which connection has enough strength to exceed any hydraulic fluid pressure that might be used in a typical sprinkler system.

It is a further object of the present invention to provide a grip lock connector which does not require adhesive or welding to facilitate a tight leakproof connection to the pipe coming from the source of water.

An additional object of the present invention is to provide a connection that requires less skill to assemble.

Another object of the present invention is to provide a final connection that can be immediately placed into service and can instantly resist the pressures required for testing and operating a fire suppression system.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
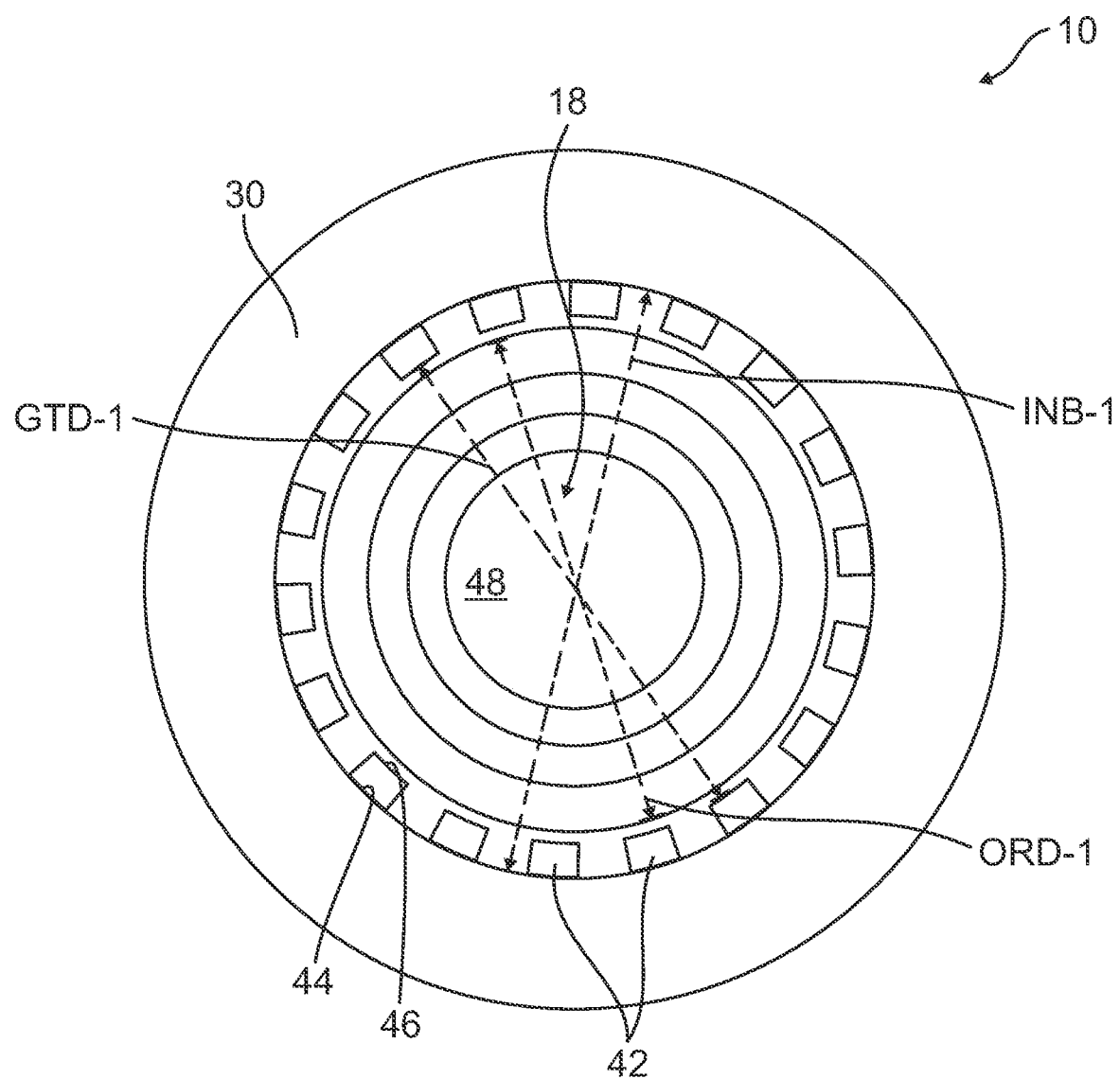
FIG. 1 is a top plan view of the present invention grip lock connector.
Figure 2:
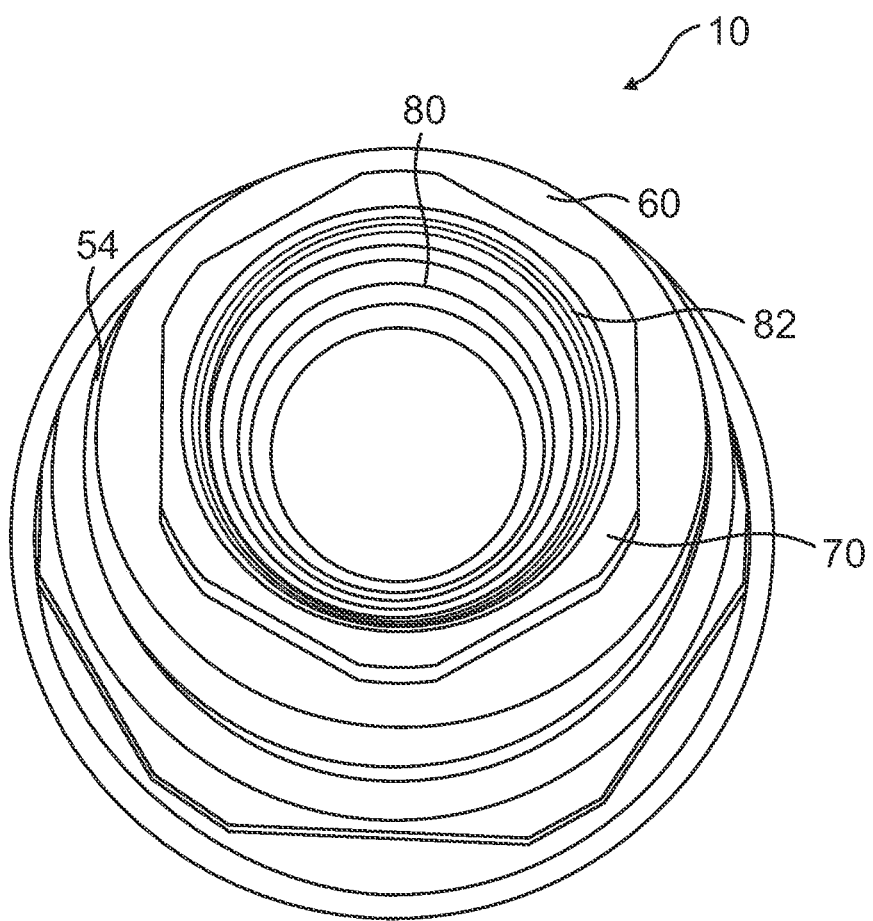
FIG. 2 is a bottom plan view of the present invention grip lock connector.
Figure 3:
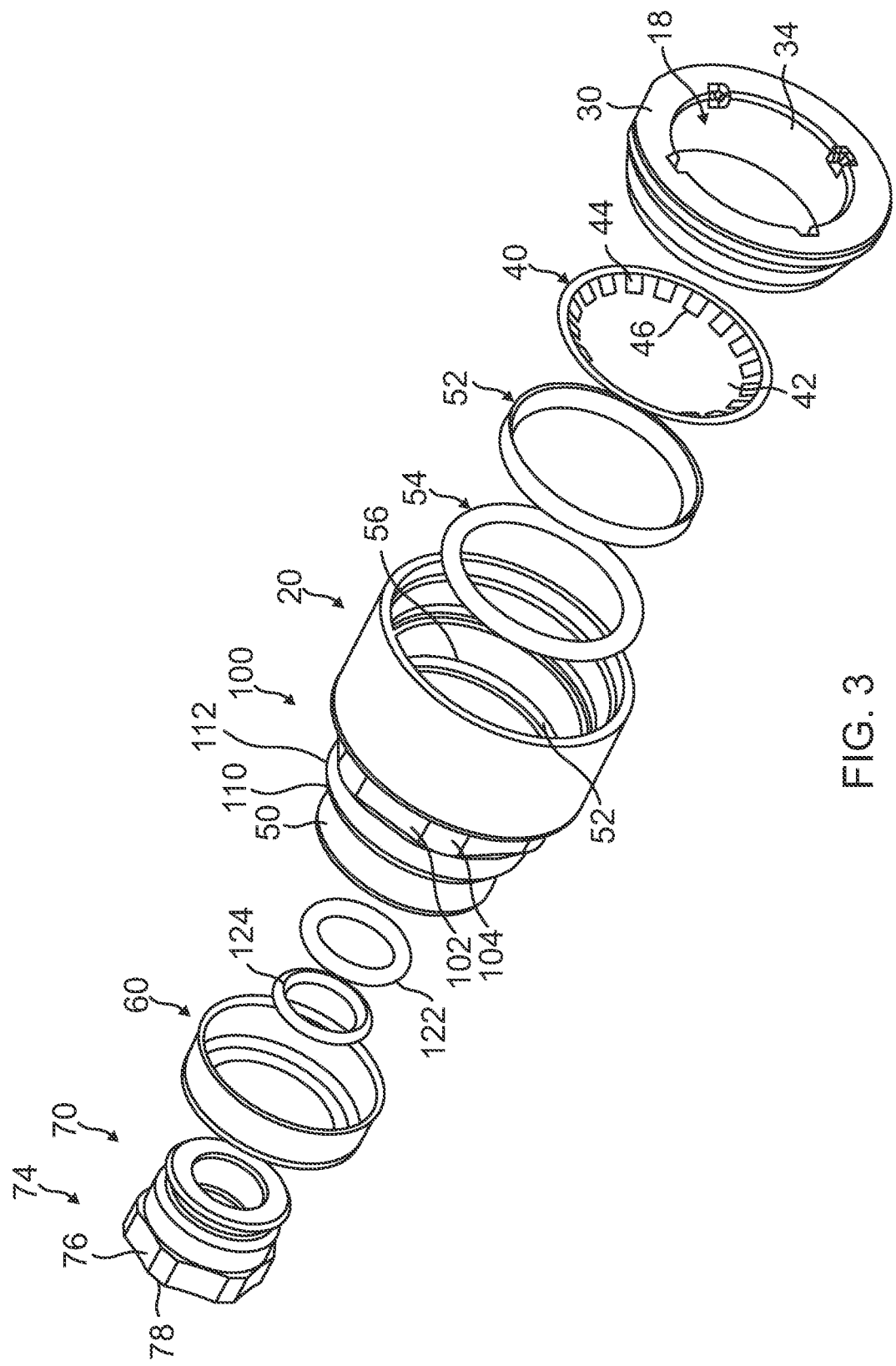
FIG. 3 is an exploded view illustrating each of the components of the present invention grip lock connector.
Figure 4:
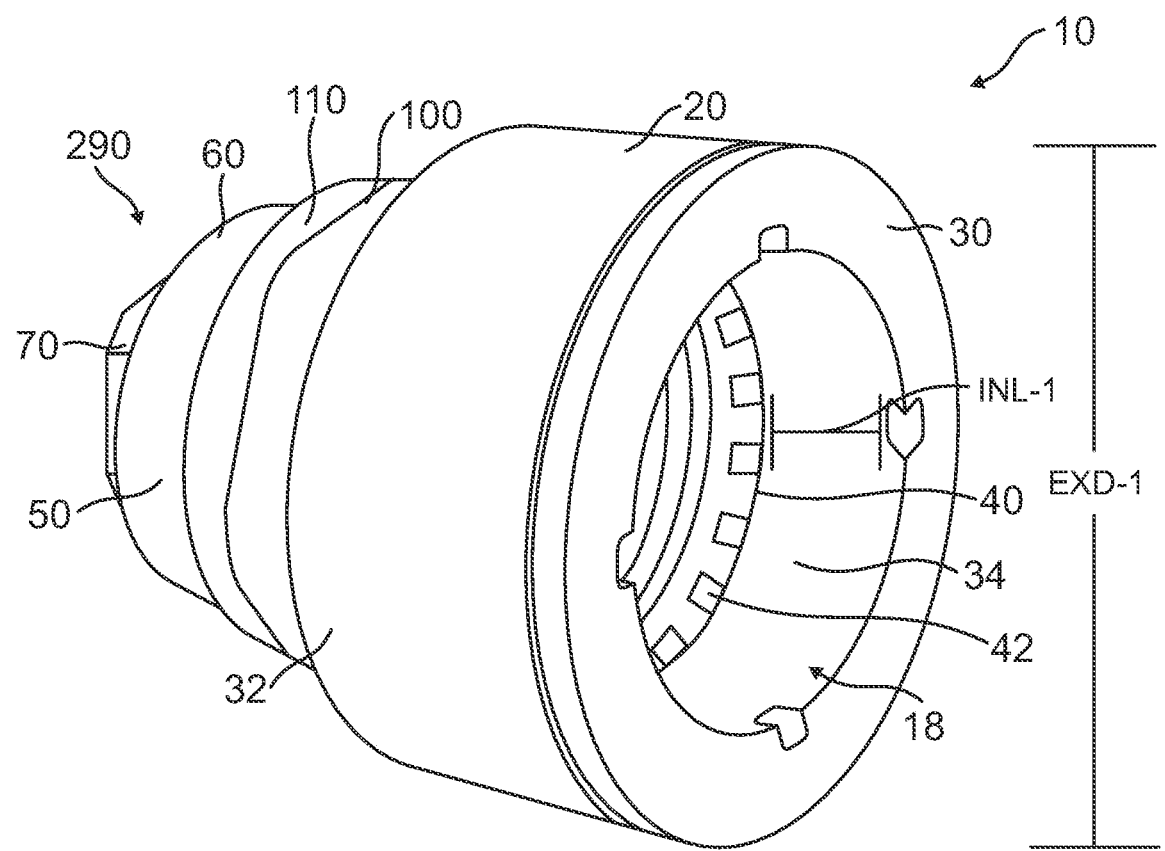
FIG. 4 is a side perspective view of the present invention grip lock connector.

Referring to FIG. 1, there is illustrated a top plan view of the present invention grip lock connector. Referring to FIG. 2, there is illustrated a bottom plan view of the present invention grip lock connector. Referring to FIG. 3, there is illustrated an exploded view illustrating each of the components of the present invention grip lock connector. Referring to FIG. 4, there is illustrated a side perspective view of the present invention grip lock connector.

Referring to FIGS. 1 through 4, there is illustrated the present invention grip lock connector 10 including a cylindrical circumferential wall 20 with a leading end 30 having an interior surface 34 with a bore diameter defined as "INBORE" and numbered "INB-1" in FIG. 1. The cylindrical circumferential wall 20 has an interior length of "INL-1". The interior circumferential wall interior surface 34 surrounds an interior chamber 18. At the interior end of interior chamber 18 is a gripper ring 40. The gripper ring is preferably made of stainless steel. The gripper ring 40 retains a multiplicity of spaced apart gripper teeth 42. Each respective one of the spaced apart gripper teeth 42, also referred to as gripping teeth, includes a rear end 44 by which each of the respective spaced apart gripper teeth 42 is retained on the gripper ring 40. Each of the respective spaced apart gripper teeth 42 includes a front or interior end 46. Each of the spaced apart respective gripper teeth 42 are bent at an inward angle relative to the distal end 290 of the grip lock connector 10. The gripper ring 40 is supported by a gripper ring retainer 52. The interior diameter of the multiplicity of respective spaced apart gripper teeth 42 (also referred to as stainless steel teeth and/or gripping teeth) have an interior diameter named "GRDIA" and numbered "GTD-1" measured from the front or interior end 46. Deeper into the interior surface 34 of cylindrical circumferential wall 20 is a rubber gasket or O-ring 54 which rests on an interior shelf 56 at the deepest end of the interior chamber 18. The rubber gasket or O-ring 54 has an interior diameter, named "ORDIA" and numbered "ORD-1" in FIG. 1. The interior diameter ORD-1 of the O-ring 54 is smaller than the interior diameter GTD-1 of the respective spaced apart gripper teeth 42. The respective spaced apart gripper teeth 42 are preferably made of stainless steel.

Figure 5:
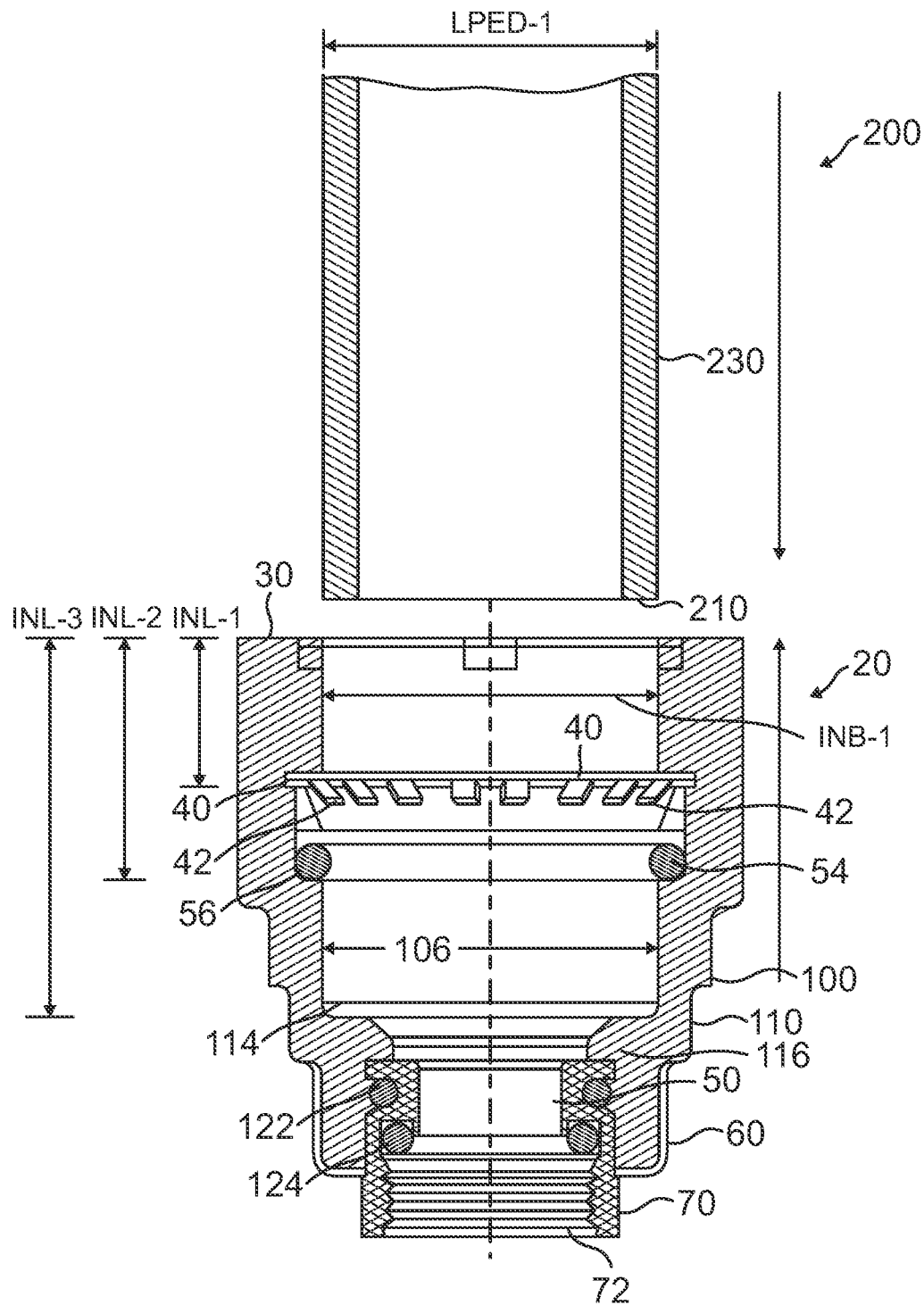
FIG. 5 is a cross-sectional view of the connection location of the leading end of the uppermost water supply pipe from a source of water and the gripping portion of the grip lock connector, before the leading end of the uppermost water supply pipe is retained in the present invention grip lock connector.

Referring to FIG. 5, there is illustrated is a cross-sectional view of the connection location of the leading end 210 of the uppermost water supply pipe 200 of a water supply pipe assembly from a source of water and the multiplicity of spaced apart gripper teeth 42 of the grip lock connector 10 before the leading end 210 of the uppermost water supply pipe 200 of a water supply pipe assembly is retained in the present invention grip lock connector 10.

Figure 6:
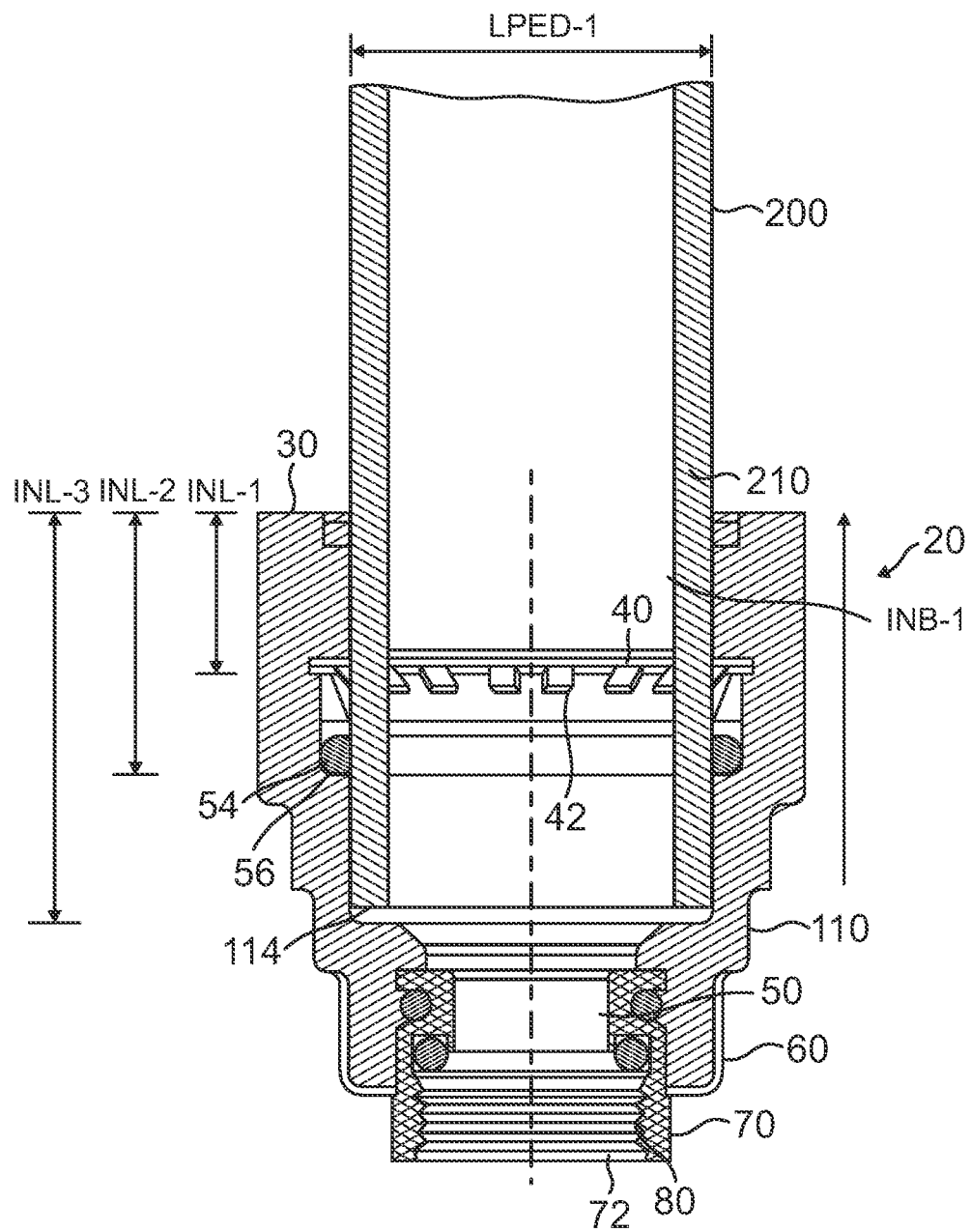
FIG. 6 is a cross-sectional view of the connection location of the leading end of the uppermost water supply pipe of a water supply pipe assembly from a source of water and the gripping portion of the grip lock connector, after the leading end and a portion of the uppermost water supply pipe is retained in the present invention grip lock connector.

Referring to FIG. 6, there is illustrated a cross-sectional view of the connection location of the leading end 210 of the uppermost water supply pipe 200 from a source of water and the multiplicity of spaced apart gripper teeth 42 and the gasket or O-ring 54 after the leading end 210 and a portion of the uppermost water supply pipe 200 is retained in the present invention grip lock connector 10.

Referring to FIGS. 5 and 6, the distance from the leading end 30 of cylindrical wall 20 to the location of the gripper ring 40 is INL-1. The distance from front surface 30 to the location of O-ring 50 is INL-2. The distance from front surface 30 to the deepest location where the water supply pipe 200 is positioned is INL-3.

Referring to FIGS. 1 through 6, the interior chamber 18 has an inner diameter of INB-1 that is suitably sized to receive with a slip fit a section of the uppermost water supply pipe 200. The multiplicity of spaced apart gripper teeth 42 has an interior diameter GTD-1 sized to interface with and affect a secure grip on the uppermost water supply pipe 200. Finally, the gasket or O-ring 54 inside diameter ORD-1 is sized smaller than the exterior diameter LPED-1 of uppermost water supply pipe 200 to firmly press against the uppermost water supply pipe cylindrical surface 230 and affect a water tight seal.

Referring to FIG. 2, there is illustrated a bottom plan view of the present invention grip lock connector 10. Referring to FIGS. 2, 3 and 4, at the distal end 290 is a non-round nut 70 that has an exterior surface 74 which, by way of example, is shaped with spaced apart hexagonal walls 76 separated by exterior spacers 78. The non-round hex nut 70 is made of metal. The non-round nut (also referred to as non-round hex nut) 70 has a cylindrical interior surface 80 with interior female mating threads 82. The interior female mating threads 82 are sized to threadedly receive male threads on a fire sprinkler. The non-round hex nut 70 is retained in a collar 60. The grip lock connector 10 has a multiplicity of reduced diameter exterior sections with exterior diameters decreasing to accommodate an exterior diameter "CEXD-1" of the collar 60 which is smaller than the exterior diameter EXD-1 of cylindrical wall 20.

The first reduced diameter section 100 has a non-round exterior surface to facilitate gripping of the grip lock connector 10. By way of example, the exterior surface of reduced diameter section 100 includes a multiplicity of hexagonal surfaces 102 separated by spacer members 104. The interior sidewall 106 (see FIG. 5) of first reduced diameter section 100 is cylindrical and has the same diameter as INB-1 to facilitate a continued slip fit of exterior surface 230 of water supply pipe 200.

The second reduced diameter section 110 has a cylindrical exterior surface 112. The interior diameter of second reduced diameter section 110 has a portion of its interior diameter the same as INB-1 until the leading end 210 of uppermost water supply pipe 200 is stopped at interior surface 114. The remaining interior of second reduced diameter section 110 has an interior wall 116 which is deeper than third reduced diameter section 50 which is sized to fit within collar 60. Reduced diameter section 50 includes a first reduced diameter O-ring 122 and a second reduced diameter O-ring 124 which is smaller than first reduced diameter O-ring 122. The second reduced diameter O-ring 124 is adjacent interior threads 82 to facilitate a leakproof connection when fire sprinkler male threads are threaded into female mating threads 82. The first reduced diameter O-ring 122 provides additional leakproof functionality because the non-round hex nut 70 is made of metal.

As the water supply pipe 200 having an exterior surface 230 with an exterior diameter LPED-1 is slip fit into INB-1 of cylindrical circumferential section 20 and continues into the same diameter interior of first reduced diameter section 100 and second reduced diameter section 110, the inwardly and downwardly spaced apart gripper teeth 42 grasp the sidewall 230 of water supply pipe 200 and prevent it from being removed from grip lock connector 10. The gasket or O-ring 54 provides a leakproof connection of the water supply pipe 200 grasped and retention gripped by the innermost ends 46 of the multiplicity of gripper teeth 42. The gripping ring 40 is embedded within interior sidewall 34 of cylindrical section 20.

Referring again to FIG. 4, there is illustrated a side perspective view of the present invention grip lock connector 10. The grip lock connector 10 includes several descending sections 100, 110 and the bottom cylindrical wall 50 surrounded by the collar 60. The reduced diameter sections 100, 110 and 50 are created to gradually reduce the bottom diameter 50 to accommodate the collar 60 which partially surrounds and encloses threaded nut 70. Threaded hex nut 70 includes interior threads 82 to match the male mating threads of a fire sprinkler.

Figure 7:
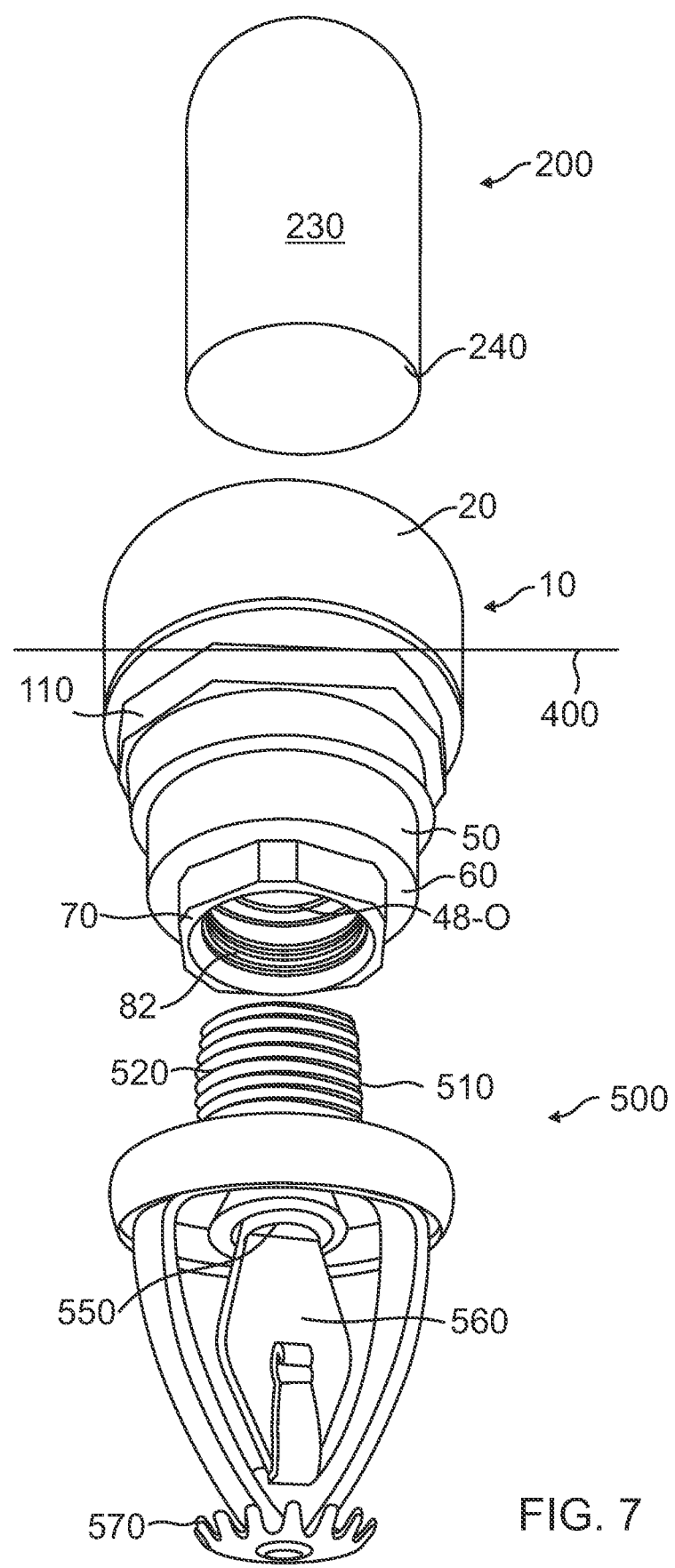
FIG. 7 is an exploded view of an uppermost water supply pipe above a ceiling and extending slightly above the ceiling, the present invention grip lock connector immediately below the uppermost water supply pipe of a water supply pipe assembly and the fire sprinkler head with a male threaded connector below the lower portion of the grip lock connector.
Figure 8:
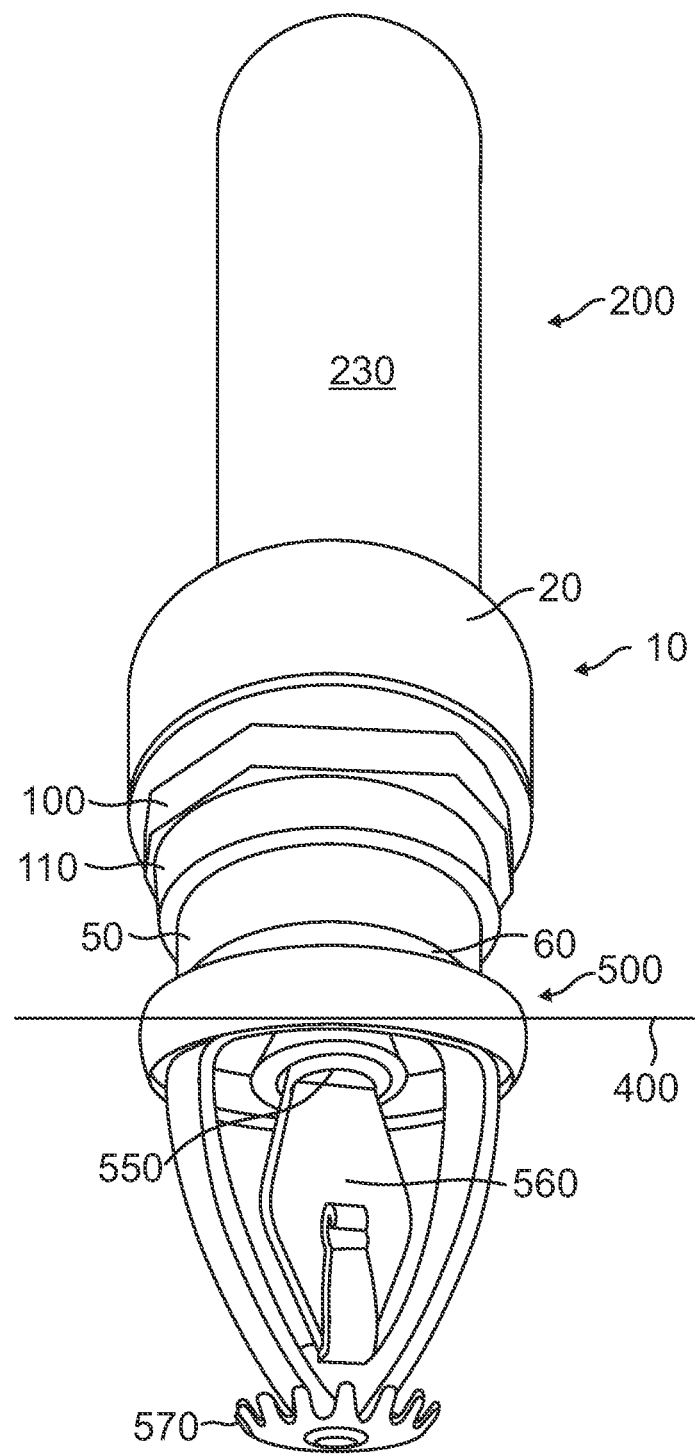
FIG. 8 is an assembled view of an uppermost water supply pipe of a water supply pipe assembly above a ceiling and extending slightly above the ceiling fixture, the present invention grip lock connector fastened with a tight grip on the uppermost water supply pipe, and the male threads of the fire sprinkler head threaded into female connecting threads in a lower portion threaded nut of the present invention grip lock connector.

Referring to FIG. 7, there is illustrated an exploded view of the water supply pipe 200 slightly above a ceiling 400, the present invention grip lock connector 10 immediately below the uppermost pipe 200 and the fire sprinkler head 500 with a male threaded connector 520 below the lower portion of the grip lock connector 10. Referring to FIG. 8, there is illustrated an assembled view of the uppermost water supply pipe 200 above a ceiling 400. The present invention grip lock connector 10 is fastened with a tight grip on the uppermost water supply pipe 200, and the male threads 520 of the fire sprinkler head 500 threaded into female connecting threads 82 in a lower portion threaded nut 70 of the present invention grip lock connector 10.

Further referring to FIGS. 7 and 8, a structure includes a ceiling 400 with the uppermost water supply pipe 200 slightly above the ceiling. The present invention grip lock connector 10 is slid over the exterior sidewall 230 of uppermost water supply pipe 200 with the multiplicity of spaced apart gripper teeth 42 gripping and retaining the sidewall 230 of the uppermost water supply pipe 200 with the gasket or O-ring 54 providing a fluid tight seal. The multiplicity of spaced apart gripper teeth 42 are preferably made of stainless steel to grip the uppermost water supply pipe 200 with enough strength to exceed any hydraulic fluid pressure that might be used in a typical sprinkler system. The fire sprinkler 500 includes an upper end 510 with male threads 520 that are threaded into the female mating threads 82 of nut 70. The present invention grip lock connector 10 has a central opening 48 within interior chamber 18, which interior opening extends through sections 100, 110, 50 and collar 60 surrounding nut 70 having female interior threads 82. The openings 48 ending in 48-O are aligned with and in fluid connection with the central opening 240 in uppermost water supply pipe 200 and in fluid communication with central opening 550 in the fire sprinkler 500. The fire sprinkler 500 includes the central opening 550 within upper end 510 leading to a seal and operating mechanism 560 leading to spray nozzles 570 in sprinkler 500. The upper end 510 includes the central opening 550 surrounded by upper wall 510 having male exterior threads 520 which are threaded into female mating threads 82.

Therefore, through the present invention, a firm tight connection is made with the interim connector connecting the uppermost water supply pipe 200 of a water supply pipe assembly from a source of water to the fire sprinkler 500.

For example, a fire sprinkler system is plumbed in 1" SDR 13.5 CPVC plastic pipe with pipe extensions that extend down from the space above a finished ceiling to just above the ceiling. The grip lock connector is assembled with a fire sprinkler head of appropriate size using the mating ½ inch NPT threads 520 and 82 to rigidly hold the head and the O-ring to effect a watertight seal.

The uppermost water supply pipe 200 is cut to the length desired for a finished assembled position of the sprinkler head 500. The grip lock connector 10 is then installed over the pipe with a diameter of 1.315 inches using the interior bore diameter INB-1 of approximately 1.340 inches to effect a loose sliding fit. As the grip lock connector 10 slides up the pipe, the leading end of the uppermost water supply pipe 200 comes in contact with the gripper teeth 42 having an interior diameter GTD-1 of 1.260 inches causing the uppermost water supply pipe to force the fingers of the multiplicity of spaced apart gripper teeth 42 out and over the uppermost water supply pipe 200 making a tight contact. As the grip lock connector 10 is further assembled onto the pipe 200, the leading end comes in contact with the O-ring 54 with an interior diameter ORD-1 of 1.250 inches, causing the leading end 210 of the pipe to force the O-ring 54 over the exterior surface 230 of the pipe 200. Finally, with the grip lock connector 10 fully assembled over the uppermost water supply pipe 200, the grip lock connector 10 is in full engagement with the lead pipe surface 230 restraining the assembly and the O-ring 54 is compressed tightly against the pipe outer surface 230 to effect a water tight seal.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus for connecting a source of water to a fire sprinkler, comprising:
    a cylindrical section having a proximal end, a distal end, and an interior chamber, wherein the proximal end of the cylindrical section is configured to receive a water supply pipe;
    a ring disposed inside the interior chamber;
    a ring retainer supporting the ring;
    a plurality of teeth disposed around the ring, the teeth positioned to contact the water supply pipe when the water supply pipe is received by the proximal end of the cylindrical section;
    a plurality of reduced exterior diameter sections having decreasing exterior diameters toward an apparatus distal end,
        wherein the plurality of reduced exterior diameter sections includes a first reduced exterior diameter section having a non-round exterior surface to facilitate gripping the apparatus, and
        wherein the plurality of reduced exterior diameter sections includes a second reduced exterior diameter section having a proximal interior diameter substantially equal to an internal diameter of a proximal end of the cylindrical section, and a distal interior diameter smaller than the proximal interior diameter;
    a reduced diameter section distal to the cylindrical section comprising a threaded portion having female mating threads configured to receive male mating threads of a fire sprinkler;
    wherein the water supply pipe has a larger internal diameter than an internal diameter of an extreme distal end of the threaded portion of the reduced diameter section.

2. The apparatus of claim 1, wherein the teeth are stainless steel.

3. The apparatus of claim 1, wherein the ring is embedded in an interior sidewall of the cylindrical section.

4. The apparatus of claim 1, wherein the ring rests on a support comprising a shelf extending into the interior chamber of the cylindrical section.

5. The apparatus of claim 1, further comprising a nut having a non-round exterior surface distal to the cylindrical section.

6. The apparatus of claim 5, wherein the non-round exterior surface comprises a hexagonal exterior surface.

7. The apparatus of claim 1, further comprising a metal nut distal to the cylindrical section.

8. The apparatus of claim 7, wherein the nut is retained in a collar.

9. The apparatus of claim 1, further comprising:
a gasket disposed in the interior chamber at a distal position relative to the ring.

10. The apparatus of claim 9, wherein the gasket has an interior gasket diameter smaller than an interior diameter of the plurality of teeth.

11. The apparatus of claim 9, wherein the gasket has an interior gasket diameter smaller than the exterior diameter of the water supply pipe.

12. The apparatus of claim 1, further comprising:
an o-ring disposed in the interior chamber at a distal position relative to the ring.

13. The apparatus of claim 12, wherein the o-ring has an interior o-ring diameter smaller than an interior diameter of the plurality of teeth.

14. The apparatus of claim 1, further comprising a nut that is retained in a collar, and the reduced diameter section is configured to accommodate an exterior diameter of the collar.

15. The apparatus of claim 1, wherein the reduced diameter section has a non-round exterior surface.

16. The apparatus of claim 15, wherein the non-round exterior surface is a hexagonal exterior surface.

17. The apparatus of claim 1, further comprising:
a reduced diameter o-ring disposed in an interior of the reduced diameter section.

18. The apparatus of claim 1, wherein the ring is coaxially aligned with the cylindrical section.

19. The apparatus of claim 1, wherein the plurality of teeth point inwardly and are angled toward the distal end of the cylindrical section.

20. The apparatus of claim 1, wherein the interior chamber is sized to receive the water supply pipe with a slip fit.

* * * * *